United States Patent [19]

Hoobyar et al.

[11] Patent Number: 5,452,746
[45] Date of Patent: Sep. 26, 1995

[54] MAIN VALVE CONSTRUCTION HAVING A CHAMBER WALL WITH A SATELLITE VALVE SEAT THEREIN AND ASSEMBLY THEREOF

[75] Inventors: Luther T. Hoobyar, Mountain View; Walter L. Connolly, Moraga; Timothy G. Hughes, Walnut Creek, all of Calif.

[73] Assignee: Aseptic Controls Investment Co., San Francisco, Calif.

[21] Appl. No.: 141,868

[22] Filed: Oct. 22, 1993

[51] Int. Cl.⁶ .................................................... F16K 7/12
[52] U.S. Cl. .......................... 137/886; 251/144; 251/331
[58] Field of Search .................................. 137/885, 886, 137/240; 251/331, 144

[56] References Cited

U.S. PATENT DOCUMENTS

| 1,121,730 | 12/1914 | Keely | 137/886 X |
| 5,152,500 | 10/1992 | Hoobyar et al. | 251/269 |

FOREIGN PATENT DOCUMENTS 2048436  12/1980  United Kingdom .................... 137/886

*Primary Examiner*—John C. Fox

[57] ABSTRACT

A valve assembly comprising a main valve body having an inlet flow passage and at least one outlet flow passage and a flow chamber extending between the same. The main valve body has a valve seat surrounding the inlet flow passage. The valve body having an opening in alignment with the inlet in the inlet flow passage. The valve body has an annular shoulder surrounding the opening. A diaphragm is disposed within the flow chamber and sealingly engages the shoulder and movable between open and closed positions with respect to the valve seat. A valve operator is mounted on the valve body for moving said diaphragm between the open and closed positions. The main valve body has a side wall and a side wall opening therein in communication with the flow chamber. The side wall has a side wall valve seat formed therein surrounding the side wall opening. A satellite body is mounted on the main valve body and has a satellite flow chamber therein in communication with the side wall opening and the flow chamber in the main valve body. A diaphragm is disposed in the satellite valve body and is movable between open and closed positions with respect to the side wall valve seat. A valve operator is carried by the satellite valve body for moving the diaphragm in the satellite flow chamber between open and closed positions with respect to the side wall seat.

2 Claims, 1 Drawing Sheet

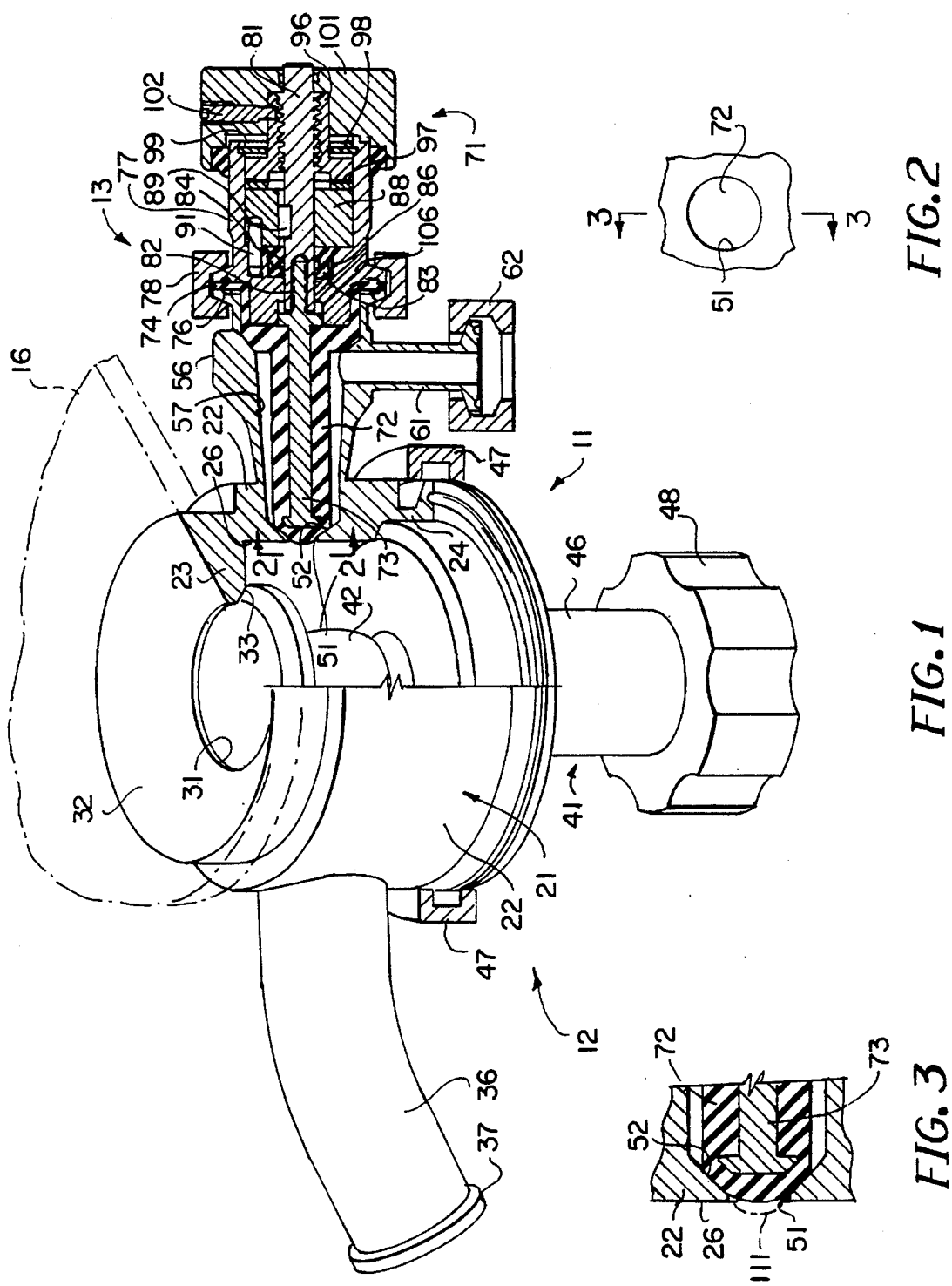

MAIN VALVE CONSTRUCTION HAVING A CHAMBER WALL WITH A SATELLITE VALVE SEAT THEREIN AND ASSEMBLY THEREOF

This invention relates to a main valve having a chamber wall with a satellite valve seat therein and an assembly thereof which is particularly adapted for use with aseptic process equipment.

Main valves heretofore have been provided which have the capabilities of having satellite valves mounted thereon. However, typically these have utilized long connectors to make it possible to make connections to the main central body chamber. Typically, these long connectors have a length ranging from 2 to 3 inches which form a deadleg for trapping flow media. This is particularly undesirable where the media may be one which may become stale or rancid. This is particularly undesirable in a number of process applications and in particular in pharmaceutical processing. There is therefore a need for a new and improved valve construction which will eliminate long deadlegs.

In general, it is an object of the present invention to provide a main valve construction and an assembly thereof which makes it possible to eliminate deadlegs for satellite valves.

Another object of the invention is to provide a main valve construction of the above character in which the chamber wall is provided with an opening extending into the chamber and in which a valve seat surrounds the opening and extends in close proximity to the inner surface of the chamber wall.

Another object of the invention is to provide a main valve construction of the above character which can be readily and economically manufactured.

Additional features and object of the invention will appear from the following description in which the preferred embodiment is set forth in conjunction with the accompanying drawings.

FIG. 1 is an isometric view partially in cross section of a main valve construction having a chamber wall with a satellite valve seat therein and with a satellite valve mounted thereon.

FIG. 2 is a cross-sectional view taken along the line 2—2 of FIG. 1.

FIG. 3 is an enlarged cross-sectional view of a portion of the chamber wall shown in FIG. 1 and showing the valve seat therein.

In general, the main valve construction and assembly thereof of the present invention is comprised of a main valve body having an inlet flow passage and at least one outlet flow passage and a flow chamber extending between the same. The valve body has a valve seat surrounding the inlet flow passage. The valve body has an opening in alignment with the inlet. The valve body has an annular shoulder surrounding the opening. A diaphragm is disposed within the chamber and sealingly engages the shoulder and is movable between open and close positions with respect to the valve seat. A valve operator is mounted on the valve body for moving the diaphragm between the open and closed positions. The body has a side wall defining the chamber and has a side wall opening therein in communication with the flow chamber. The side wall has a side wall valve seat formed therein surrounding the side wall opening. A satellite valve body is mounted on the main valve body and has a satellite flow chamber therein in communication with the side wall opening and has a flow passage in communication with the flow chamber in the satellite valve body. A diaphragm is mounted in the satellite flow chamber and is movable between open and closed positions with respect to the side wall seat. Valve operator means is carried by the satellite valve body for moving the diaphragm in the satellite chamber between said open and closed positions.

More specifically, as shown in the drawings, the valve construction and assembly 11 consists of a main valve 12 and a satellite valve 13. The assembly 11 is adapted to be utilized in connection with a conventional aseptic processing tank having bottom and side walls and is adapted to be mounted on either of the side wall or the bottom wall of the tank. In FIG. 1, the assembly 11 is shown mounted on the bottom wall 16 of a tank (not shown).

The main valve 12 consists of a main valve body or housing 21 formed of a suitable material such as stainless steel and having a generally cylindrical configuration. The main valve body is provided with a cylindrical wall 22 and end walls 23 and 24 to provide the generally cylindrical flow chamber or gallery 26. The end wall 23 is provided with a centrally disposed inlet flow passage 31 which opens up into the bottom tank wall 16 and which opens down into the chamber 26. The end wall 23 is provided with an inclined surface 32 which is generally in alignment with the concave surface of the bottom wall 16 and is tapered inwardly towards the end of the inlet flow passage 31. The end wall 23 is also provided with an annular valve seat 33 which encircles or surrounds the opening 31. The cylindrical wall 22 is provided with an outlet flow passage (not shown) extending through the wall 22 and is in communication with the chamber 26 and with a flow passage (not shown) provided in an elbow outlet 36 secured to the side wall 22 by suitable means such as welding. The outlet elbow is provided with a flange 37 adapted to be secured by a clamp to another pipe or fitting (not shown). Alternatively, the flange 37 may be replaced by a plain butt weld end for a welded connection.

Valve operator means 41 is provided for interrupting flow between the inlet flow passage 31 and the outlet elbow 36 and is of the type described in U.S. Pat. No. 5,152,500. As disclosed therein, such valve operator means 41 can include a diaphragm 42 disposed within the flow chamber 26 and movable into and out of engagement with the valve seat 33 to interrupt the flow of a liquid through the tank bottom wall 16 and through the inlet flow passage 31 into the flow chamber 26. The diaphragm 42 has a portion thereof which is clamped between the end wall flange 24 and a flanged sleeve 46 releasably secured to the main valve body 21 by a removable clamp 47. The diaphragm 42 also sealingly engages an annular shoulder 45 forming a part of the sidewall 22 which is concentric with the opening 31. The valve operator 41 also includes a knob or handwheel 48 adapted to be grasped by a human hand to move the diaphragm 42 between open and closed positions with respect to the valve seat 33.

In accordance with the present invention, another flow passage or side wall opening 51 is provided in cylindrical wall 22 of the main valve body 21. As shown in FIG. 1 this opening 51 is in communication with the flow chamber 26. The cylindrical wall 22 has a valve seat 52 formed therein which encircles or surrounds the side wall opening 51. The valve seat 52 is tapered in such a manner so that its inner extremity is in close proximity to the inner surface of the wall 22.

A satellite valve body 56 is mounted on the wall 22 by suitable means such as welding and has a flow chamber 57 therein in communication with the flow chamber 26 in the main valve body 21 through the side wall opening 51. A fitting 61 is secured to the satellite valve body 56 by a suitable means such as welding as shown or can be formed integral therewith and can be coupled by a clamp 62 to other piping, as for example steam piping in the event that it is desired to utilize the fitting for introducing steam for sterilization and cleaning through the satellite valve 13.

Satellite valve operator means 71 similar to the valve operator means 41 hereinbefore described in conjunction with the main valve 12 can be utilized for the satellite valve 13. Thus, as shown therein there is provided a diaphragm 72 which is movable into and out of sealing engagement with the side wall valve seat 52. The diaphragm can be formed of a suitable material such as silicone rubber. An insert 73 formed of a suitable material such as stainless steel extends into the flow chamber 57 and has the diaphragm 72 mounted thereon. The diaphragm 72 is provided with an outwardly extending flange 74 which seats over a flange 76 forming a part of the satellite valve body 56. A flanged sleeve 77 extends over the other side of the flange 74 of the diaphragm 72 and is formed of a suitable material such as stainless steel. The flanged sleeve 77 is secured to the flange 76 by a clamp 78 to firmly clamp the diaphragm flange 74 therebetween. A shaft 81 extends into the flanged sleeve 77 and is coupled to the insert 73 by a suitable means such as a threaded connection 82. The shaft 81 extends through a guide bushing 83 formed of a suitable material such as TEFLON and forms a sealing engagement with the flanged sleeve by the use of inner and outer 0-rings 84 and 86. A key sleeve 88 formed of a suitable material such as brass is mounted on the shaft 81 and is keyed thereto by a key 89. An anti-rotation pin 91 has one end disposed in the key sleeve 88 and has the other end extending into the flanged sleeve 77.

A flanged nut 96 is threaded onto the shaft 81 as shown and is provided with wafer bearings 97 and 98 on opposite sides of the same in which the wafer bearing 97 engages the key sleeve 88 and the wafer bearing 98 is engaged by a snap ring 99 seated within the flanged sleeve 77 as shown. A knob 101 formed of a suitable material such as stainless steel or plastic is secured to the flanged nut 96 by a suitable means such as a set screw 102.

As the knob 101 is moved between clockwise and counterclockwise positions, the diaphragm 72 is moved between open and closed positions with respect to the side wall valve seat 52 to permit communication between the fitting 61 and the flow chamber 57 through the side wall opening 51 and into the chamber 26. The operation of the satellite valve operator means 71 is very similar to that described in U.S. Pat. No. 5,152,500 and therefore will not be described in detail.

A leak indication vent 106 is provided in the satellite valve body 77 for a similar purpose as that described in U.S. Pat. No. 5,152,500.

The operation and use of the main valve 12 in the assembly 11 is very similar to that described in U.S. Pat. No. 5,152,500. The satellite valve can be utilized for steam cleaning and other purposes. It also should be appreciated that if desired additional satellite valves can be provided on the main valve body utilizing a similar construction in which the valve seat is formed in the wall of the main valve body.

From the foregoing construction of the satellite valve it can be seen that the dead space has been reduced to zero or near zero because of the fact that the diaphragm when the satellite valve is closed extends slightly inwardly as shown by the dotted line 111 and is at least flush with the inner surface of the wall forming the main flow chamber 26. The valve seat has been brought very close to the flow line within the flow chamber 26 and therefore there is no space for a deadleg between the flow line and the location of the valve seat. As shown, the satellite valve seat is substantially at the surface of the inner wall forming the main flow chamber. With the construction shown, the satellite valve has been close mounted to the main valve. The diaphragm of the satellite valve extends into the wall of the main body and forms a seal with the valve seat formed in the main body with the outer surface being flush with or extending slightly beyond the inner surface of the chamber wall. In other words, a valve seat has been provided in the main body or in one part with the valve operating mechanism structure being separate from it.

From the foregoing it can be seen that there has been provided a main valve construction and an assembly thereof having a chamber wall with a satellite valve seat therein making it possible to utilize a satellite valve without dead space, or in other words with zero dead space. This is particularly advantageous in many processes, as for example aseptic processes in which media is utilized which can turn rancid or deteriorate in deadlegs.

What is claimed is:

1. A valve assembly comprising a main valve body having an inlet flow passage and at least one outlet flow passage and a flow chamber extending between the inlet flow passage and the at least one outlet flow passage, said main valve body having a valve seat surrounding the inlet flow passage, said main valve body having an opening in alignment with the inlet flow passage, said main valve body having an annular shoulder concentric with said opening, a diaphragm disposed within the flow chamber and sealingly engaging the shoulder and movable between open and closed positions with respect to the valve seat, valve operator means mounted on the valve body for moving said diaphragm between said open and closed positions, said main valve body having a side wall and a side wall opening therein in communication with the flow chamber, said side wall having a side wall valve seat formed therein surrounding said side wall opening, a satellite body mounted on said main valve body and having a satellite flow chamber therein in communication with the side wall opening and the flow chamber in the main valve body, a diaphragm disposed in the satellite valve body and movable between open and closed positions with respect to the side wall valve seat and valve operator means carried by the satellite valve body for moving said diaphragm in the satellite flow chamber between open and closed positions with respect to the side wall seat.

2. An assembly as in claim 1 wherein said side wall has an inner surface defining said chamber, said side valve seat having an inclined surface extending into a region which is in close proximity to the inner wall surface and wherein said diaphragm in the satellite chamber when in a closed position has a surface which is substantially flush with the inner surface of the main valve body so that when the satellite valve is in a closed position, there is substantially no dead space between the flow chamber in the main valve body and the diaphragm of the satellite valve.

* * * * *